Oct. 1, 1929.  L. D. VERMETTE  1,729,636
WINDSHIELD WIPER
Filed March 28, 1928
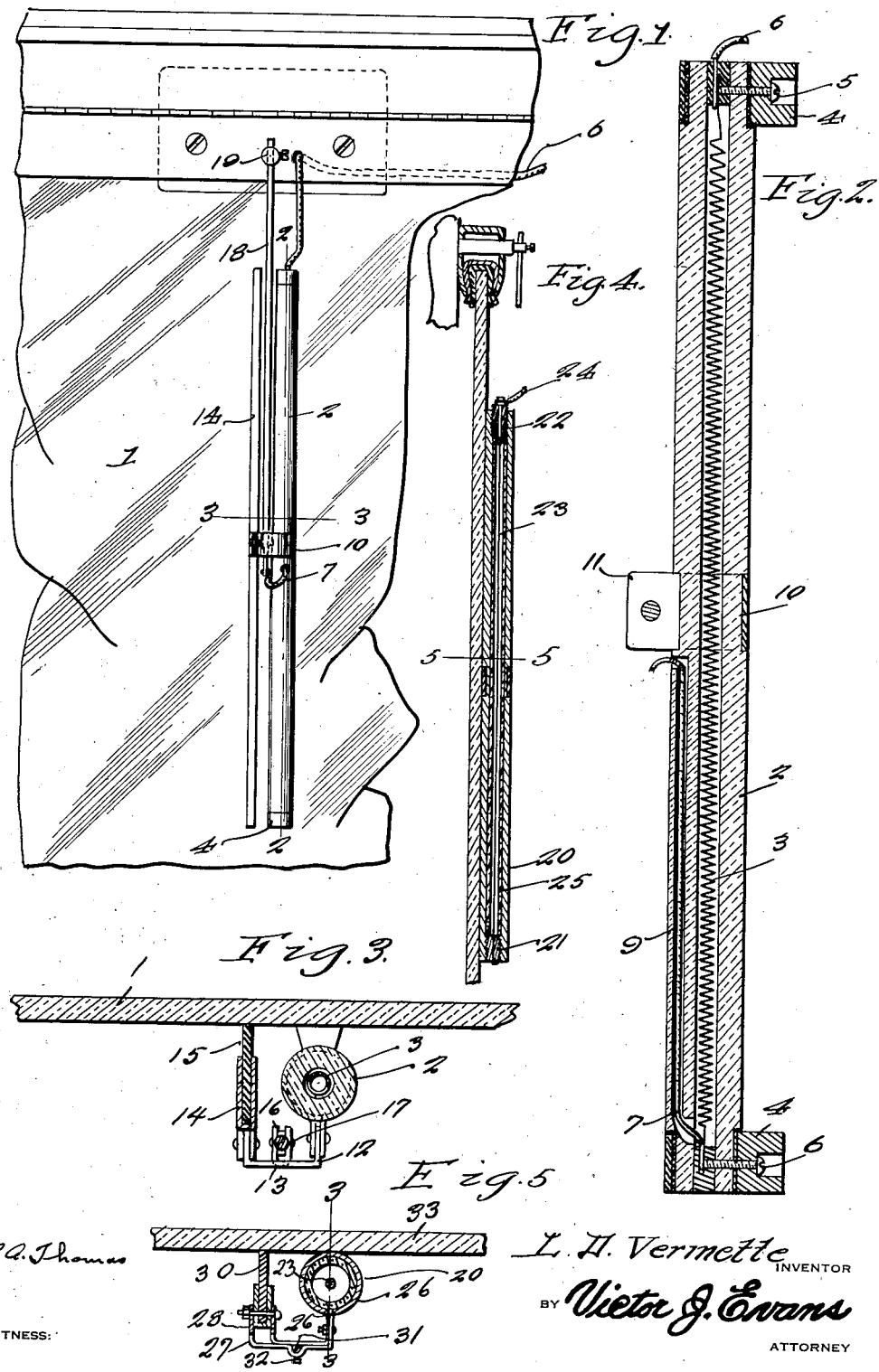

Patented Oct. 1, 1929

1,729,636

UNITED STATES PATENT OFFICE

LUCIEN D. VERMETTE, OF LUDLOW, MASSACHUSETTS

WINDSHIELD WIPER

Application filed March 28, 1928. Serial No. 265,468.

My present invention has reference to a windshield wiper designed for wiping accumulations of moisture from the windshields of automobiles, street cars or other devices having exposed transparent panes, and my primary object is the provision of a wiper for this purpose which may be operated either by hand, suction, or electricity, and which includes a squeegee or wiper proper and a heater disposed in parallelism with the sqeegee and movable therewith, and whereby frost, snow or like accumulations will be melted by the heater and wiped from the windshield by the squeegee, and further in which there is means for shutting off the heat from the heater so that the device may be used with equal efficiency in summer or winter.

To the attainment of the foregoing and other objects which will present themselves, the improvement also resides in certain other novel features of construction, combination and operative association of parts, satisfactory embodiments of which are disclosed by the accompanying drawings.

In the drawings:

Figure 1 is an elevation illustrating the improvement in applied position.

Figure 2 is a sectional view approximately on the line 2—2 of Figure 1.

Figure 3 is a transverse sectional view approximately on the line 3—3 of Figure 1.

Figure 4 is a sectional view approximately on the line 3—3 of Figure 4, and illustrating a slight modification.

Figure 5 is a sectional view approximately on the line 5—5 of Figure 4.

Referring now to the drawings and to Figures 1 to 3 in particular, the numeral 1 designates a windshield for an automobile, street car or the like. Arranged against the outer face of the windshield there is my improved wiper. The wiper includes a tubular member 2 of porcelain or other non-electric conducting material. The bore of the said wiper has arranged therein a heating coil 3. The inner face of the tubular member, adjacent to the ends thereof, has clamped thereon rubber blocks 4 which are designed to contact with the windshield 1. Passing through blocks and through the clamps for the blocks there are bolt members 5 and 6', respectively, the bolt member 5 being secured to the conductor 6 that leads from a suitable source of electricity, such source being directed from the battery of the automobile when the device is employed in connection with this type of machines, and preferably the conductor 6 is controlled by a switch, (not shown). The second end of the coil 3 is connected to the bolt 6' and the said bolt is in turn connected to a conductor 7 that is trained through a suitable opening 9 adjacent to the outer face of the tubular member 2.

Arranged in a central annular depression in the tubular insulator member 3 there is a split band 10 having its ends formed with outstanding parallel ears 11.

Received between and secured to the ears 11 there is one of the angle ends 12 of a bracket 13. The split member 10 may be considered as one of the elements of the bracket 13. The second angle end of the bracket has secured thereto the casing 14 for a squeegee 15, and the squeegee is in direct contact with the windshield 1. The body of the bracket is centrally formed with a pair of inwardly directed ears 16 between which there is passed and to which there is pivotally secured, as at 17, the operating rod 18 for the wiper. The conductor 7 is grounded to the operating rod 18.

The wiper may be caused to sweep against the windshield or like pane 1 in any desired or preferred manner, and in the showing of Figure 1 the operating rod 18 is connected to a shaft 19 which may be alternately rotated by suction from the vacuum tank of an automobile, by electric power, hand or other power.

With the improvement it will be seen that should snow, sleet, or other accumulations become frosted on the windshield 1, the heat from the heater will melt the same and the squeegee will effectively wipe such accumulations from the windshield.

In Figures 4 and 5 I have illustrated a slight modification. In this instance the tubular casing for the heater is of metal and is indicated by the numeral 20. The tubular member 20 has screwed in both of its ends plugs 21 and 22 and received through these plugs there is a heater wire 23. The upper end of the wire is connected by a conductor 24 to a suitable source of electricity. The wire is arranged in an insulator casing 25, the same being preferably of isinglass. The plug 22 is insulated from the metal tubular member 20 but the plug 22 is preferably of metal. Thus one end of the heating wire or coil 23 is grounded on the member 20. The tubular member 20, at the center thereof is formed with an annular depression for the reception of a split band or ring 26 to whose outstanding end there is secured a bracket 27. In this instance, the bracket is made up of two parts, the outer ends of which being flanged in the same direction is indicated by the numerals 28 and 29 and these ends have clamped therebetween a squeegee 30. The outer element of the bracket is centrally bulged for the reception of the operating rod 31 and the said operating rod is clamped in the bulged portion by a binding element 32. In this instance the tubular member 20 is brought directly against the windshield or pane 33, and is, of course, one end of the squeegee 30. In other respects the device operates in a manner as above described.

Having described the invention, I claim:

A windshield wiper, including a tubular member having a heating element therein and designed to be arranged adjacent to the face of a windshield, upper and lower rubber blocks clamped on the ends of the tubular member, and spacing said member from direct contact with the windshield, a split ring centrally seated in the tubular member and having outstanding straight portions, a substantially U-shaped plate having one of its ends pivoted between the said outstanding straight portions of the ring and having its second end bifurcated for the reception of a squeegee, whose outer edge is in direct contact with the windshield, said U-shaped member having a pair of centrally arranged inwardly directed ears, and an operating rod received between and pivoted to said ears.

In testimony whereof I affix my signature.

LUCIEN D. VERMETTE.